No. 834,964.
PATENTED NOV. 6, 1906.
D. F. BRODERICK.
TRY SQUARE.
APPLICATION FILED MAR. 7, 1906.
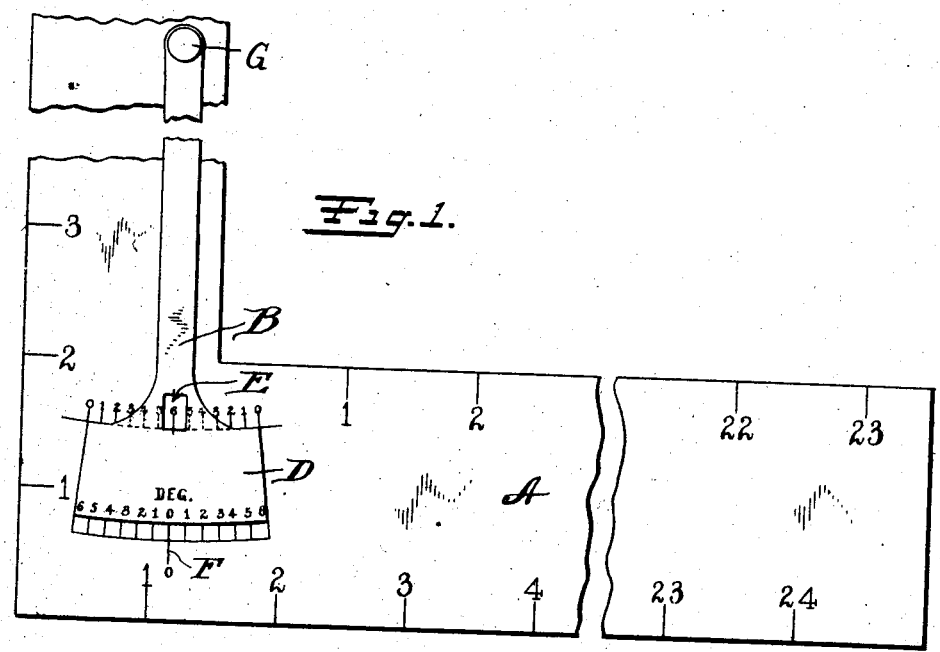
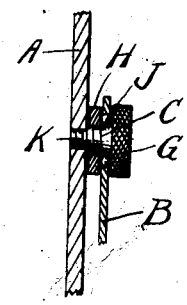
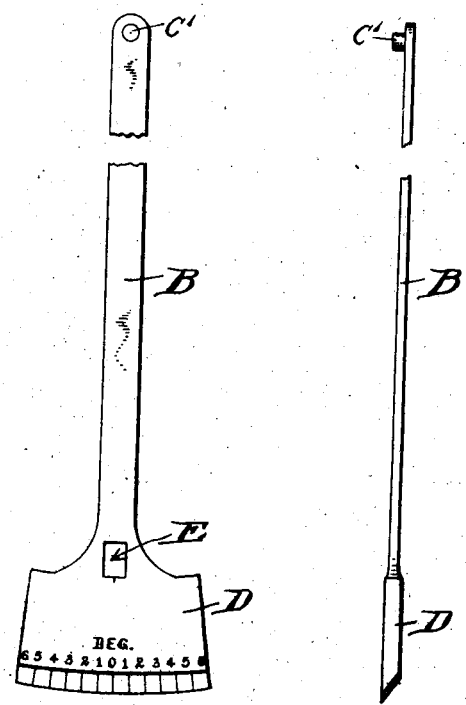
Witnesses
Inventor
DAVID F. BRODERICK
By his Attorneys

UNITED STATES PATENT OFFICE.

DAVID FELIX BRODERICK, OF HARTFORD, CONNECTICUT, ASSIGNOR OF ONE-HALF TO LEWIS SPERRY, OF HARTFORD, CONNECTICUT.

TRY-SQUARE.

No. 834,964.     Specification of Letters Patent.     Patented Nov. 6, 1906.

Application filed March 7, 1906. Serial No. 304,653.

*To all whom it may concern:*

Be it known that I, DAVID FELIX BRODERICK, a citizen of the United States, residing at Hartford, county of Hartford, State of Connecticut, have invented certain new and useful Improvements in Try-Squares, of which the following is a full, clear, and exact description.

My invention relates to improvements in measuring instruments—for example, such as try-squares for carpenters, masons, and the like—the object being to provide means in conjunction with the try-square to permit its use as a level or plumb, with which may also be ascertained angles of inclination in perpendiculars and horizontals.

The particular form of the invention shown in the drawings is such that by a single means the operator may ascertain the angle of inclination in either degrees or inches for a certain definite distance.

In the drawings, Figure 1 is an elevation of my improved instrument. Fig. 2 is a detail sectional view. Fig. 3 is a front elevation of a detail of construction detached. Fig. 4 is an edge view of said detail.

A is a try-square provided with the usual graduations along its edges. From one arm of the try-square is suspended a pendulous member B, having at its lower end a fan-like scale portion D. The pivot-stud C of the member B is preferably fastened to it and adapted to be removably inserted in a socket or perforation in the square.

E is a peep-hole through the fan portion D. Along the lower edge of the part D is a series of graduations reading away from a central zero-mark in opposite directions. These graduations indicate degrees. Upon the body A of the try-square is an index-mark, (indicated at F,) whereby the angle of inclination in degrees may be read in connection with the graduated scale just described.

Upon the body A of the square is a scale having graduations "0, 1, 2, 3, 4, 5, 6, 5, 4, 3, 2, 1, 0," the zeros being radially in line with the side edges of the extension D of the pivoted pendulum B when the parts are in the position shown. When the lower edge of the square is rested on a surface which is inclined from the horizontal, the pendulum will swing to the right or left, according to the direction of inclination of the supporting-surface. The number on the scale which is opposite one of the radial side edges of the extension D under such circumstances will indicate the inclination in terms of the ratios, say, of sixteenths of an inch of rise per running foot. If the supporting-surface is inclined upward toward the left, the pendulum will hang in a position with its left-hand radial edge of the extension D beneath, say, "2," indicating that the inclination from the horizontal is at the rate of two-sixteenths or one-eighth of an inch per running foot—that is, the tangent of the angle of inclination is $\frac{1}{8} \div 1 \times 12 = \frac{1}{96} = .010416$. These graduations may be arranged in the same order as the graduations on the lower scale and readable through the opening E on the fan-like portion D, and a central index-mark adjacent to the edge of said peep-hole may be used to facilitate accurate reading.

The stud C has a thumb-head G. The washer H is screwed onto the stud and clamps the balls J, so as to afford a substantially frictionless bearing for the member B. The inner end of the stud is reduced in diameter and screws into a tapped hole in the body of the try-square, so that the pendulous member may be readily attached or detached. The form of stud C' (shown in Figs. 3 and 4) is intended to fit rather loosely in a hole in the try-square body. The lower end D is preferably rather heavy to make the device more sensitive. The thickened portion also helps to hold the long shank away from the try-square, and thus avoid friction.

The invention may be applied to a standard square. It serves all the purposes of a spirit level or plumb with the additional advantage of greater accuracy of reading.

What I claim, and desire to secure by Letters Patent, is—

1. An instrument of the character described, comprising a body having two flat arms at right angles to each other, with straight uninterrupted inner and outer side edges, one of said arms having a socket near one end, a removable pendulous member having a pivot adapted to be engaged in said socket, a long shank, and a heavy fan-like enlarged lower end with a graduated scale on the lower edge, said body having an index-mark near the junction of its arms and adjacent said scale whereby the inclination of the body may be read.

2. In an instrument of the character described, a flat body having two arms forming the angles of a square, and a removable pendulous member suspended from one arm and having an enlarged fan-like projection at its lower end with a scale on the lower edge thereof, and an index-line on the body adjacent said scale.

3. In combination, a square having two flat arms with a threaded perforation in one arm near one end, and a removable pendulous member comprising a bar having an enlarged fan-like portion at its lower end with a scale thereon, a thumb-screw passing through said bar at the opposite end, a washer adjustable thereon, a series of balls arranged between said washer and the head of said screw and forming a bearing for said bar, said screw taking into the perforation in said square.

DAVID FELIX BRODERICK.

Witnesses:
DENNIS F. BROWN,
HARRY W. REYNOLDS.